United States Patent
Lee et al.

(10) Patent No.: US 9,927,998 B2
(45) Date of Patent: Mar. 27, 2018

(54) FLASH MEMORY COMPRESSION

(71) Applicant: Tidal Systems, Inc., Santa Clara, CA (US)

(72) Inventors: Meng Kun Lee, Cupertino, CA (US); Priyanka Thakore, San Jose, CA (US)

(73) Assignee: Tidal Systems, Inc., Santa Clara, CA (US)

( * ) Notice: Subject to any disclaimer, the term of this patent is extended or adjusted under 35 U.S.C. 154(b) by 124 days.

(21) Appl. No.: 14/173,586

(22) Filed: Feb. 5, 2014

(65) Prior Publication Data

US 2015/0220277 A1    Aug. 6, 2015

(51) Int. Cl.
*G06F 3/06* (2006.01)
*G06F 12/02* (2006.01)

(52) U.S. Cl.
CPC ............ *G06F 3/064* (2013.01); *G06F 3/0608* (2013.01); *G06F 3/0625* (2013.01); *G06F 3/0688* (2013.01); *G06F 12/0246* (2013.01); *G06F 2003/0692* (2013.01); *G06F 2212/1016* (2013.01); *G06F 2212/1028* (2013.01); *G06F 2212/1044* (2013.01); *G06F 2212/401* (2013.01); *G06F 2212/7207* (2013.01);
(Continued)

(58) Field of Classification Search
CPC .. G06F 12/0246; G06F 3/0608; G06F 3/0625; G06F 3/0688; H03M 7/30
See application file for complete search history.

(56) References Cited

U.S. PATENT DOCUMENTS 5,757,295 A * 5/1998 Bakhmutsky ......... H03M 7/425
                                                    341/100
6,243,081 B1    6/2001 Goris et al.
(Continued)

FOREIGN PATENT DOCUMENTS

GB    2519629 A    4/2015
JP    H11501488 A    2/1999
(Continued)

OTHER PUBLICATIONS

Office Action from related Japanese patent application No. 2016-550793, dated Jul. 18, 2017, 9 pp.
(Continued)

*Primary Examiner* — Ryan Bertram
*Assistant Examiner* — Trang K Ta
(74) *Attorney, Agent, or Firm* — Brooks, Cameron & Huebsch, PLLC

(57) ABSTRACT

Systems and method for reading compressed data from non-volatile storage such as an SSD device are disclosed. A logical section, e.g. page, of data includes a plurality of data blocks that are compressed such that the lengths thereof are different. A header section of the page stores headers for the data blocks and storing a length for each data block. The header section may be a codeword encoding the headers according to an error correction scheme. To read out a data block a hardware decoder requests reading of the page and transfers the header section into a hardware decoder that decodes the headers to obtain an offset for a desired data block. Without instructing reading of the page, the offset is used by the hardware decoder to request transfer of the desired data block that is then decoded and returned to a requesting device.

20 Claims, 8 Drawing Sheets

(52) U.S. Cl.
CPC ... *G06F 2212/7208* (2013.01); *Y02B 60/1225* (2013.01); *Y02B 60/1246* (2013.01)

(56) References Cited

U.S. PATENT DOCUMENTS

| | | | |
|---|---|---|---|
| 9,105,305 B2 | 8/2015 | Werner et al. | |
| 9,582,431 B2 | 2/2017 | Cohen | |
| 2010/0021142 A1* | 1/2010 | Minami | H04N 19/70 386/241 |
| 2011/0099321 A1 | 4/2011 | Haines et al. | |
| 2011/0307659 A1* | 12/2011 | Hans et al. | 711/114 |
| 2012/0069911 A1* | 3/2012 | Richardson | H04N 19/70 375/240.25 |
| 2013/0019138 A1* | 1/2013 | Liang | G06F 11/1012 714/755 |
| 2013/0326117 A1 | 5/2013 | Aune | |
| 2013/0342375 A1* | 12/2013 | Manning et al. | 341/87 |
| 2014/0208003 A1* | 7/2014 | Cohen | G06F 12/0246 711/103 |
| 2014/0281168 A1* | 9/2014 | Koseki | G06F 11/108 711/103 |
| 2015/0154118 A1* | 6/2015 | Marcu et al. | 711/103 |
| 2016/0321015 A1 | 11/2016 | Fukutomi et al. | |

FOREIGN PATENT DOCUMENTS

| | | |
|---|---|---|
| JP | 2000105839 A | 4/2000 |
| JP | 2013161447 A | 8/2013 |
| JP | 2013545202 A | 12/2013 |
| JP | 2014142931 A | 8/2014 |
| JP | 2014150593 A | 8/2014 |
| JP | 2015036981 A | 2/2015 |
| JP | 2015525423 A | 9/2015 |

OTHER PUBLICATIONS

Search Report from related European patent application No. 15746233.4, dated Sep. 1, 2017, 11 pp.
Notice of Preliminary Rejection from related Korean patent application No. 10-2016-7024056, dated May 18, 2017, 21 pp.
Office Action from related Japanese patent application No. 2016-550793, dated Nov. 21, 2017, 4 pp.

* cited by examiner

FLASH MEMORY COMPRESSION

BACKGROUND

This invention relates to systems for accessing compressed data in a flash memory system.

Solid-state drives, also referred to as SSDs, are data storage devices that make use of nand flash memory devices as storage elements. Typically such devices have a SSD controller that accepts host commands on one end and communicate to the nand flash on the other. Nand flash is a type of non-volatile storage device that retains data when powered off. The SSD controller accesses the nand flash device through the nand interface. Nand devices have a finite number of write/program cycles. The data write operation into the nand flash includes two phases. The data transfer phase and the memory program phase. Similarly, the data read is broken down into two phases. First the memory read phase and second the data transfer phase. The memory read phase introduces a very large delay (~60 μs) for the controller as compared to the read out time for data.

The physical hierarchy of a nand flash die is broken down into planes, blocks, and pages. A nand flash die can contain multiple planes, each plane is divided into blocks and every block contains N pages. A typical nand will have 2 planes, ~4K blocks and 256 pages per block.

As is readily apparent, the page is the smallest memory unit for read and write operations, i.e. a program or read operation is performed on a page. Typical nand page sizes are ~4 KByte, ~8 KByte, and ~16 KByte. The page sizes may be slightly larger than 4 KByte, 8 KByte, or 16 KByte to accommodate the ECC parity data. The typical nand interface data rates can be 200 MBps to 400 MBps. For a read, the memory read time will be ~60 μs and data transfer out would be ~40 μs for ~16 KB data, ~20 μs for 8 KB data and ~10 μs for 4 KB.

Logical block addressing (LBA) is a common scheme used for specifying the location of blocks of data stored on computer storage devices, generally systems such as hard drives and SSDs (see, e.g., http://en.wikipedia.org/wiki/Computer_storage).

Typical host LBA granularity is 512 bytes and 4 KB in SSD aware hosts. The SSD controller can choose to operate on 4 KBytes and manages the mapping between the 512 byte host LBA number and the 4 KByte controller LBA number. Each LBA in the system needs to be mapped to unique data units. The size of this data unit defines how large the physical address pointer is. As a result, the size of the LBA pointer would be a function of the number of dies, number of blocks, number of pages and size of data unit, depending on the size of the data unit in the page.

For example, in one example configuration an SSD is configured as follows:

Number of dies in the system: 128 dies=$2^7$
Number of blocks per die: 4 K+blocks=$2^{13}$
Number of pages per block: 256 pages=$2^8$
LBA data unit size: ~4 KB
Number of 4 KB LBAs in 16 KB page: 4
Physical Device Capacity: 128*4K(+)*256*16 KB+=$2^{43}$
Logical Device Capacity: 128*4K*256*16 KB=$2^{41}$=2 TB
Number of LBA Locations in the Device: 2 TB/4 KB=$2^{29}$
Total Bits in one Entry of the LBA Table to point to physical Location=7 (For dies)+13 (For blocks)+8 (For pages)+2 (For 4 LBAs)=30 Bits Total LBA Table size to store physical LBA location=30 bits*$2^{29}$ Entries=1.875 GBytes.

The LBA entry is usually rounded to byte granularity for each firmware management schema. As a result, 4 bytes are used for each LBA entry and total LBA table size becomes 4B*$2^{29}$ entries=2 GBytes. In this case, the 4 KB Host data is encoded and mapped as 4 KB data and parity bits into the nand flash.

The apparatus and methods disclosed herein provide an improved apparatus and methods for storing data in a nand flash SSD or other non-volatile storage device. The apparatus and methods disclosed both increase the amount of data that may be stored in an SSD and reduce the size of the LBA table used to access an SSD.

BRIEF DESCRIPTION OF THE DRAWINGS

In order that the advantages of the invention will be readily understood, a more particular description of the invention briefly described above will be rendered by reference to specific embodiments illustrated in the appended drawings. Understanding that these drawings depict only typical embodiments of the invention and are not therefore to be considered limiting of its scope, the invention will be described and explained with additional specificity and detail through use of the accompanying drawings, in which.

DETAILED DESCRIPTION

Figure 1:
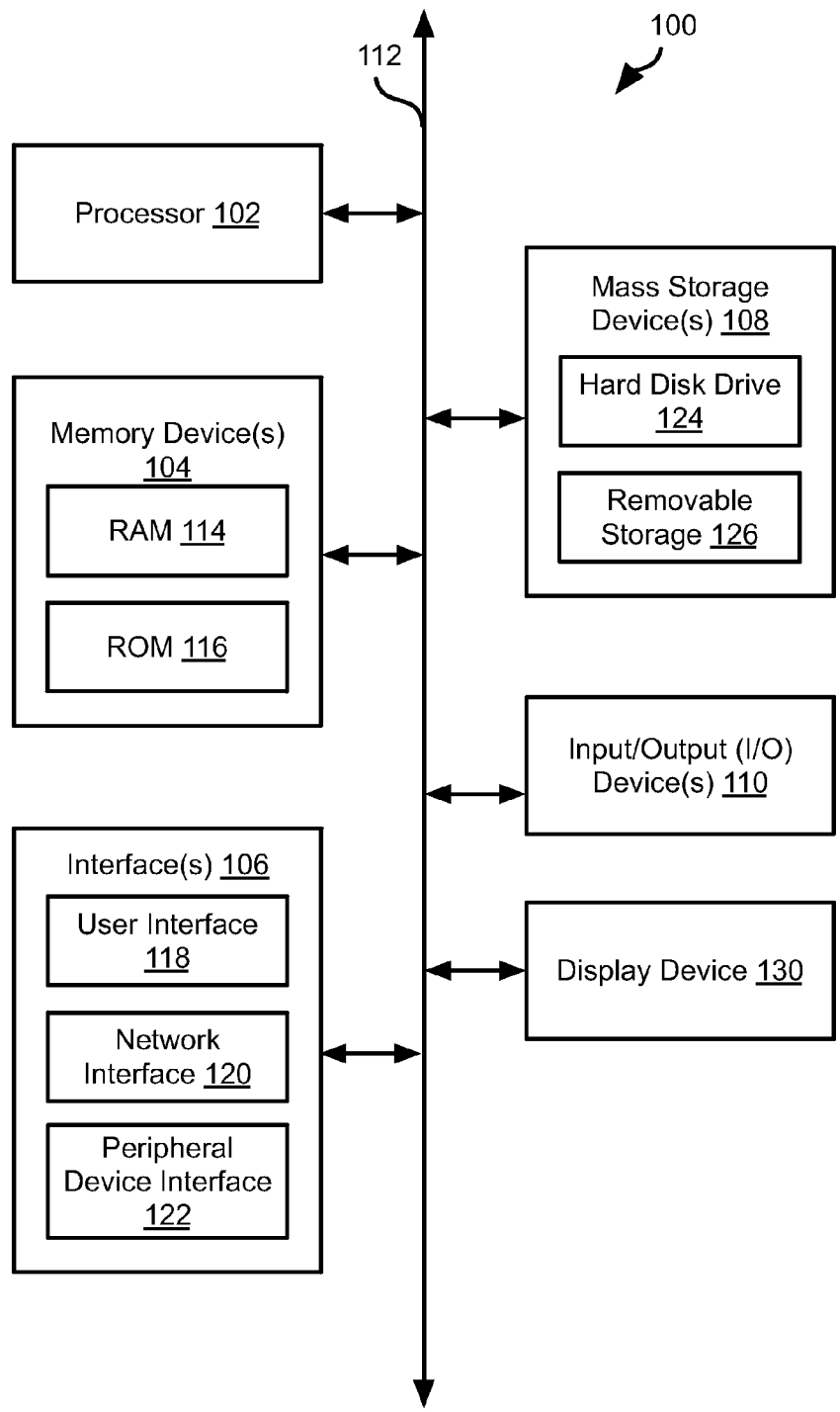
FIG. 1 is a schematic block diagram of a computing system suitable for implementing methods in accordance with embodiments of the invention.

It will be readily understood that the components of the present invention, as generally described and illustrated by example in the Figures herein, could be arranged and designed in a wide variety of different configurations. Thus, the following more detailed description of the embodiments and examples of the invention, as represented in the Figures, is not intended to limit the scope of the invention, as claimed, but is merely representative of certain examples of presently contemplated embodiments in accordance with the invention. The presently described embodiments will be best understood by reference to the drawings, wherein like parts are designated by like numerals throughout.

The invention has been developed in response to the present state of the art and, in particular, in response to the problems and needs in the art that have not yet been fully solved by currently available apparatus and methods.

Accordingly, the invention has been developed to provide apparatus and methods for storing and accessing compressed data in a flash memory.

Embodiments in accordance with the present invention may be embodied as an apparatus, method, or computer program product. Accordingly, the present invention may take the form of an entirely hardware embodiment, an entirely software embodiment (including firmware, resident software, micro-code, etc.), or an embodiment combining software and hardware aspects that may all generally be referred to herein as a "module" or "system." Furthermore, the present invention may take the form of a computer program product embodied in any tangible medium of expression having computer-usable program code embodied in the medium.

Any combination of one or more computer-usable or computer-readable media may be utilized. For example, a computer-readable medium may include one or more of a portable computer diskette, a hard disk, a random access memory (RAM) device, a read-only memory (ROM) device, an erasable programmable read-only memory (EPROM or flash memory) device, a portable compact disc read-only memory (CDROM), an optical storage device, and a magnetic storage device. In selected embodiments, a computer-readable medium may comprise any non-transitory medium that can contain, store, communicate, propagate, or transport the program for use by or in connection with the instruction execution system, apparatus, or device.

Computer program code for carrying out operations of the present invention may be written in any combination of one or more programming languages, including an object-oriented programming language such as Java, Smalltalk, C++, or the like and conventional procedural programming languages, such as the "C" programming language or similar programming languages. The program code may execute entirely on a computer system as a stand-alone software package, on a stand-alone hardware unit, partly on a remote computer spaced some distance from the computer, or entirely on a remote computer or server. In the latter scenario, the remote computer may be connected to the computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions or code. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a non-transitory computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

FIG. 1 is a block diagram illustrating an example computing device 100. Computing device 100 may be used to perform various procedures, such as those discussed herein. Computing device 100 can function as a server, a client, or any other computing entity. Computing device can perform various monitoring functions as discussed herein, and can execute one or more application programs, such as the application programs described herein. Computing device 100 can be any of a wide variety of computing devices, such as a desktop computer, a notebook computer, a server computer, a handheld computer, tablet computer and the like.

Computing device 100 includes one or more processor(s) 102, one or more memory device(s) 104, one or more interface(s) 106, one or more mass storage device(s) 108, one or more Input/Output (I/O) device(s) 110, and a display device 130 all of which are coupled to a bus 112. Processor(s) 102 include one or more processors or controllers that execute instructions stored in memory device(s) 104 and/or mass storage device(s) 108. Processor(s) 102 may also include various types of computer-readable media, such as cache memory.

Memory device(s) 104 include various computer-readable media, such as volatile memory (e.g., random access memory (RAM) 114) and/or nonvolatile memory (e.g., read-only memory (ROM) 116). Memory device(s) 104 may also include rewritable ROM, such as flash memory.

Mass storage device(s) 108 include various computer readable media, such as magnetic tapes, magnetic disks, optical disks, solid-state memory (e.g., flash memory), and so forth. As shown in FIG. 1, a particular mass storage device is a hard disk drive 124. Various drives may also be included in mass storage device(s) 108 to enable reading from and/or writing to the various computer readable media. Mass storage device(s) 108 include removable media 126 and/or non-removable media.

I/O device(s) 110 include various devices that allow data and/or other information to be input to or retrieved from computing device 100. Example I/O device(s) 110 include cursor control devices, keyboards, keypads, microphones, monitors or other display devices, speakers, printers, network interface cards, modems, lenses, CCDs or other image capture devices, and the like.

Display device 130 includes any type of device capable of displaying information to one or more users of computing device 100. Examples of display device 130 include a monitor, display terminal, video projection device, and the like.

Interface(s) 106 include various interfaces that allow computing device 100 to interact with other systems, devices, or computing environments. Example interface(s) 106 include any number of different network interfaces 120, such as interfaces to local area networks (LANs), wide area networks (WANs), wireless networks, and the Internet. Other interface(s) include user interface 118 and peripheral device interface 122. The interface(s) 106 may also include one or more user interface elements 118. The interface(s) 106 may also include one or more peripheral interfaces such as interfaces for printers, pointing devices (mice, track pad, etc.), keyboards, and the like.

Bus 112 allows processor(s) 102, memory device(s) 104, interface(s) 106, mass storage device(s) 108, and I/O device(s) 110 to communicate with one another, as well as other devices or components coupled to bus 112. Bus 112 represents one or more of several types of bus structures, such as a system bus, PCI bus, IEEE 1394 bus, USB bus, and so forth.

For purposes of illustration, programs and other executable program components are shown herein as discrete blocks, although it is understood that such programs and components may reside at various times in different storage components of computing device 100, and are executed by processor(s) 102. Alternatively, the systems and procedures described herein can be implemented in hardware, or a combination of hardware, software, and/or firmware. For example, one or more application specific integrated circuits (ASICs) can be programmed to carry out one or more of the systems and procedures described herein.

Figure 2:
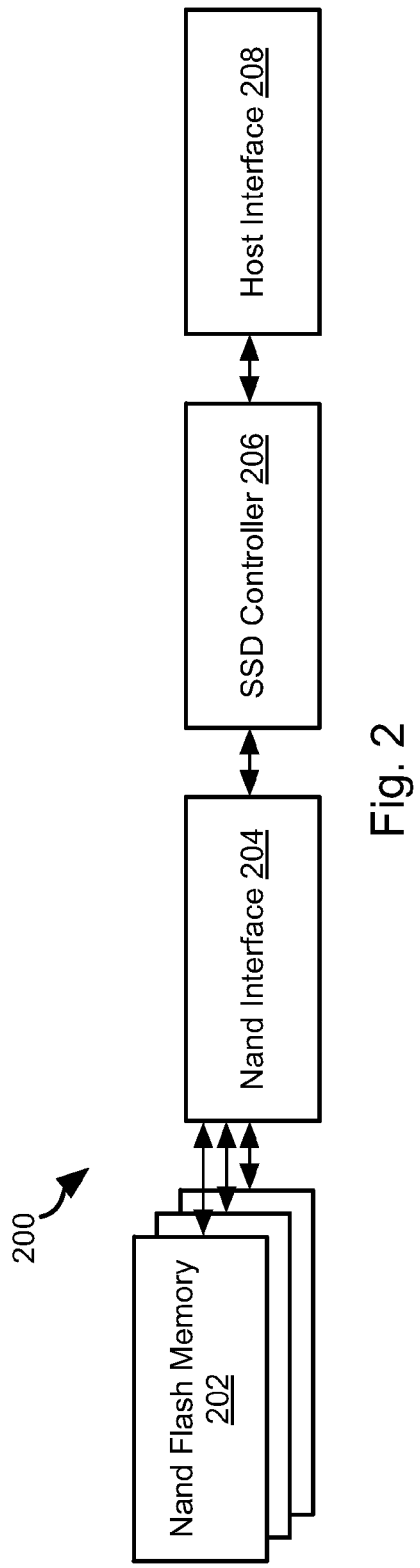
FIG. 2 is a schematic block diagram of a components of a storage system in accordance with the prior art.

Referring to FIG. 2, in some embodiments, a system 200 including an SSD 200 may include a plurality of nand flash memory devices 202. One or more nand devices 202 may interface with a nand interface 204 that interacts with an SSD controller 206. The SSD controller 206 may receive read and write instructions from a host interface 208 implemented on or for a host device, such as a device including some or all of the attributes of the computing device 100. The host interface 208 may be a data bus, memory controller, or other components of an input/output system of a computing device.

The systems and methods disclosed herein may be implemented by an SSD controller 206 interposed between the host interface 208 and the nand interface 204. In other embodiments, the nand interface 204 may implement some or all of the functionality disclosed therein. In still other embodiments, an additional component may be interposed between a conventional nand interface 204 and SSD controller 206 in order to implement all or part of the functions disclosed herein.

The systems and methods disclosed herein advantageously provide for compression of data stored within the nand flash memory 202 while also reducing data required to map and access the compressed data, such as an LBA table stored in the nand flash memory, SSD controller, RAM of the host computing device, or some other memory device.

Exemplary use cases are provided herein as examples of Case 1: Naïve Data Compression Approach An inherent advantage of compression is that it increases the total logical system capacity and reduces the total power consumed during read and write operations. In particular, a same number of host LBAs may occupy less space as compared to uncompressed data. As a result, with the same physical space, the number of LBAs (i.e. data) that can be stored inside the nand increases. If the maximum compression rate is 50%, up to two times more data (and LBAs) may be assigned for the same capacity. In the above example, assuming all LBAs have this compression rate, that means one can store 8 compressed LBAs in one 16 KB physical page instead of 4 uncompressed LBAs. The compression rate defines the length of the data written into the page.

If different LBA data have different compression rates (which is typical of compression algorithms), the final lengths of these compressed LBA data are different. Now the granularity instead of being 4 KB depends on the smallest unit and each compressed LBA data size is variable. In some embodiments, it can be either 1 byte granularity to offset exactly to the start of the encoded codeword data or 1 KB if 1 KB is assumed to be smallest unit (this is off from the other cases described herein). This has a direct implication on the LBA pointer size. Now instead of 2 bits to indicate the location, 15 bits need to be saved to pinpoint the exact start of the LBA data in the 16 KB+(=$2^{15}$ Bytes) page or 5 bits in case of 1 KB granularity. This not only increases the physical space needed for the LBA mapping table by 50%, as shown in calculations below, but also makes the LBA pointer greater than 32 bits (unaligned) (the LBA table needs few more bits for firmware management). This is a huge overhead for the system in terms of SRAM space and in terms of LBA table lookup as any access over 32 bit requires multiple reads and management of overlap data.

As each LBA can be assigned a separate codeword, this requires providing start locations for each of the LBAs in the LBA table. As the compressed LBA length can be variable, the start location of each LBA can possibly have to be as detailed as a byte or 2 bytes, i.e. for a 16 KB+ page the offset value can be in the range of 0~$2^{15}$ and the address pointer pointing within the page would be 15 bits. Assuming up to 25% compression ratio, each 4 KB of user data can be compressed to 1 KB plus codeword bits. In extreme cases, all LBAs are 25% Compressed and each 16 KB+ page can contain 16 LBAs. Accordingly, the values characterizing the schema of Case 1 are as follows:

Logical Device Capacity: 128*4K*256*16 KB=$2^{41}$=2 TB

Number of LBA locations in the device: 2 TB/4 KB=$2^{29}$ Entries

Total Bits in one entry of the LBA table considering variable offset across 16 KB+page Length=7 (For dies)+13 (For blocks)+8 (For pages)+15(Variable LBA Offset across 16 KB+page size)=43 Bits Per Entry Total LBA table size to store physical LBA location=43 Bits*$2^{29}$ Entries=2.6875 GBytes Total LBA table size when rounding each entry to byte boundary, 6 Byte per Entry=6 Byte*$2^{29}$=3 GByte.

For Case 1, access to the compressed data of the LBAs may be performed as follows:

1) Firmware (e.g. firmware of a host device) readouts the LBA table Entry along with the N Bits (e.g., 43) allocated for the LBA Offset.

2) Nand readout for the entire LBA codeword.

3) Decode the codeword.

4) LBA user data obtained for purpose of host transfer or for internal operation like garbage collection.

The naïve approach of Case 1 has the problem of a very large LBA table size. One approach to address this problem would be saving a pointer for each LBA into the nand page itself instead of the LBA table. This approach is discussed in greater detail below (Cases 3, 4, and 5). If a header were used to store the pointer information, this would require reading out the header information to get the LBA start location or LBA offset in the physical page. This header information also needs to be encoded with the same correction capability as user data. This approach can be done in two ways to retrieve the LBA data. A first way is to read the header first to get the pointer information, and read out LBA data in a second read. This way there are two reads required from the nand (see Case 3, below). A second way is to read both header and LBA data altogether in one read, and locate LBA data later. This second approach incurs redundant data read out from the nand, as location of LBA data cannot be determined before finding the pointer information (see Case 4, below).

Case 2: LBA Pointer Storage in Nand Device

Another approach is to encode the pointer information along with the user data in a codeword. In this case, reading out the pointer information would involve reading out the entire codeword containing the user data, decoding it and then finding the pointer information to the LBA data. In this approach, the LBA table has to store the codeword locations and number of codewords per LBA in order to read out the pointer information and LBA data. For compression rates of up to 25%, the number of LBAs in the 16 KB+ physical page would range from 4 LBAs up to 16 LBAs. The number of bits allocated to the codeword identification in the LBA table would depend on the size of the encoded codeword. For a 2 KB codeword, the total number of codewords in the 16 KB physical page would be 8 and would need 3 bits in the LBA table. The bigger the codeword size, the more LBAs per codeword it will contain. As compressed LBA can crossover multiple codewords, e.g. 4 KB data can cross over three 2 KB codewords. Thus 2 more bits on top of 3 bits i.e. 5 bits are needed to point to the LBA content in the encoded codeword.

Figure 3A:
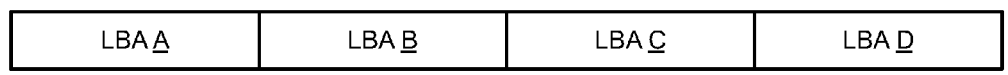
FIGS. 3A through 3D illustrate data storage schema, including storage schema in accordance with embodiments of the present invention.
Figure 3B:

Referring to FIG. 3A, in a conventional approach, a page includes a plurality of LBAs A-D each having identical widths. For a naïve compression approach with pointers stored in the LBA table (Case 1), a page may include a plurality of LBAs A-D having variable lengths as shown in FIG. 3B. Inasmuch as the LBAs A-D have variable lengths, multiple of the LBAs A-D may be encoded in the same codeword. For example, inasmuch as LBA A is small, compressed LBA A and LBA B may be encoded in a single codeword for error correction purposes. For example LBA A and LBA B may be encoded in a single codeword CWAB that can be decoded to obtain both LBA A and LBA B.

Figure 3C:
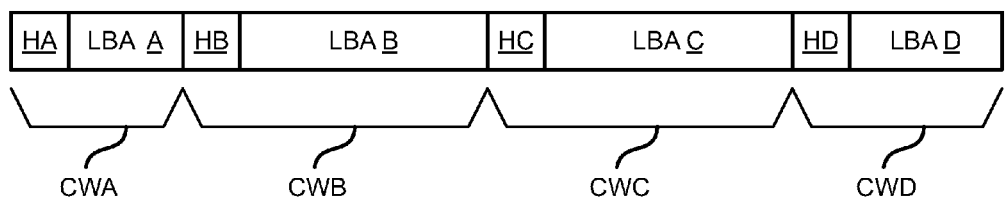

Referring to FIG. 3C, Case 2 may store each LBA A-D with a corresponding header HA-HD. Each LBA A-D and its corresponding header HA-HD may be encoded in a single codeword CWA-CWD.

For the storage scheme of Case 2, the characterizing values are as follows:

Logical Device Capacity: 128*4K*256*16 KB=2^41=2 TB

Number of LBAs locations in the device: 2 TB/4 KB=2^29 Entries

Total Bits in one entry of the LBA table considering variable offset across 16 KB+page Length=7 (For dies)+13 (For blocks)+8 (For pages)+5(2 KB codeword Offset and Up to 4 KB data offset within the 2 KB codeword.)=33 Bits Per Entry Total LBA table size to store physical LBA location=33 Bits*2^29 Entries=2.0625 GBytes Rounding each entry to byte, 5 Byte per entry=5 Byte*2^29=2.5 GByte.

For Case 2, access to the compressed data of the LBAs may be performed as follows:

1) Firmware readouts the LBA table entry along with the N Bits allocated for the codeword, where N is the number of bits in the codeword.

2) Nand readout for the entire codeword (~60 μs nand flash read time plus ~10 μs data transfer time).

3) Decode the codeword.

4) Obtain the pointer information which points to the LBA start.

5) Use data at this location as LBA user data for purpose of host transfer or for Internal operation like garbage collection.

The Disadvantage of case 2 is reading out more data than necessary, i.e. if a codeword contains 8 LBAs then to read out 1 LBA involves reading out the rest of the 7 LBAs as well. This burns transfer power and nand transfer time. Also decoding needs to be performed on the 8 LBAs+header information thus burning additional decoder power (7× more power than necessary). Also, decoding 8 LBAs instead of 1 LBA takes additional time, thus impacting performance. With this approach (Case 2), The LBA table size increases by 25% and to read out the LBA incurs additional read out of the entire codeword and post processing computation of the header information to obtain the LBA offset.

Case 3: Separate Storage of Pointers in Separate Codeword

Figure 3D:
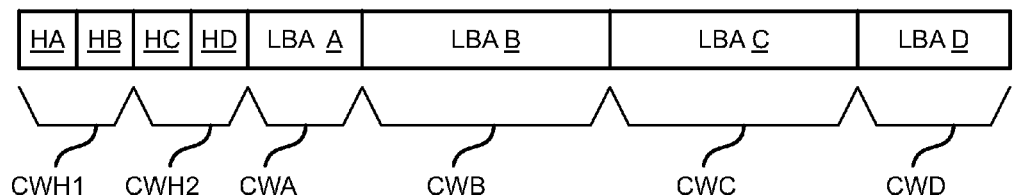

In another example, each LBA is encoded as an independent codeword and the pointer information is saved inside the nand as a separate codeword. For example, as shown in FIG. 3D, the headers HA-HD corresponding to LBAs A-D are stored in a separate codeword or codewords than the LBAs A-D themselves. For example, HA and HB may be encoded in codeword CWH1 whereas codewords CWH2 encodes headers HC and HD. The LBAs A-D are separately encoded into one or more codewords CWA-CWD. As for other embodiments disclosed herein, multiple LBAs A-D may be represented in a single codeword. For example, LBA A and LBA B may be represented by the same codeword CWA. Alternatively, each LBA A-D may be represented by its own codeword CWA-CWD.

For Case 3, reading of data from a particular LBA may proceed as follows:

1) Firmware readouts the LBA table entry that does not contain the pointer to the specific LBA data.

2) Issue nand read and readout the header codewords (~60 μs memory read time+data transfer time).

2) Decode the header codewords.

3) Post process the decoded header codeword to obtain the pointer information which points to the LBA start.

4) Reissue page read incurring another ~60 μs nand read time+data transfer time.

5) Decode the LBA data.

6) Use data at this location as LBA user data for purpose of host transfer or for internal operation like garbage collection.

Case 4: Readout of Both Headers and LBAs with Subsequent Data Extraction

In another approach, data stored as shown in FIG. 3D may be accessed as follows:

1) Issue nand page read and read out the entire page content (~60 μs memory read time+data transfer time).

2) Decode the entire page content including the header pointer codewords post process the decoded header codeword to obtain the pointer information which points to the LBA start.

3) Obtain LBA data from decoded page content using pointer information.

4) Use data at this location as LBA user data for purpose of host transfer or for internal operation like garbage collection.

Case 5: Hardware Decoder Implementing Separate Header and LBA Data Transfers for Single Page Read The approach of Case 5 described below remedies the deficiencies of the foregoing approaches. In particular, Case 5 may advantageously:

1) remove the LBA offset bits from the LBA table. The LBA table only needs to contain the location of the LBA up to the physical page level, not the offset inside the page;

2) reduce data required to be read out and decoded to the requested LBA plus the header section, thus saving transfer time and transfer power;

3) require only decoding performed on a specific LBA and header section thereby saving decoding power, which includes decoder engine power and dram access power;

4) achieve high performance with no need to post process and break up header and data by the firmware inasmuch as this is performed by a hardware decoder; and 5) not require re-encoding of LBAs during garbage collection or system data recycle process.

Figure 4:
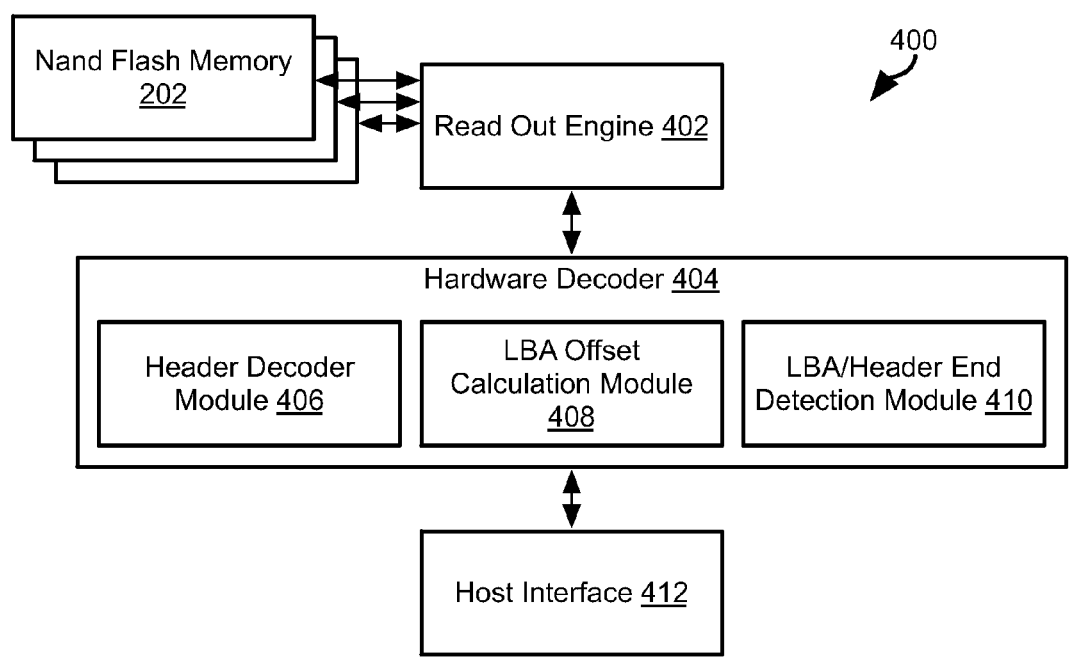
FIG. 4 is schematic block diagram of a hardware decoder in accordance with an embodiment of the invention.

Referring to FIG. 4, the illustrated system may be incorporated into an SSD controller 206 or nand interface 204 in order to provide access to compressed data according to the systems and methods disclosed herein. A hardware decoder 404 may be interposed between a read out engine 402 and a host interface 410. The read out engine 402 may be operable respond to page reads from the hardware decoder 404 and, in response, retrieve the requested page from the nand flash memory 202 and store it in an internal buffer. The read out engine 402 may be further operable to respond to transfer instructions from the hardware decoder by reading data referenced by the transfer instruction from the internal buffer and providing the data to the hardware decoder.

The hardware decoder 404 may include header decoder module 406, an LBA offset calculation module 408, and a LBA/header end detection module 410. The header decoder module 406 is operable to decode the header codewords. The offset calculating module 408 may be configured to calculate the offset for each LBA codeword and determine an offset for a specific LBA requested in a read instruction received from the host interface 412 by the hardware decoder 404. The LBA/header end detection module 410 uses the offset determined from the headers to determine an actual offset within a page for the requested LBA. This may include determining an end of the header section in order to obtain a base offset. The offset determined from the headers may then be added to this base offset in order to obtain an offset within a page for the requested LBA.

The hardware decoder 404 may be configured to automatically issue the appropriate LBA read out for the LBA at the offset determined for the requested LBA. In embodiments where this entire operation is executed by hardware, there is no need for firmware of a host device to post process the data. Also as the hardware decoder 404 decodes the header and computes the offset, the same page read operation is used to read out both the header codewords and the LBA data codeword thus removing the need for a second page read operation. The format of the header and data in the page and the sequence of operations are described in greater detail below.

Figure 5:
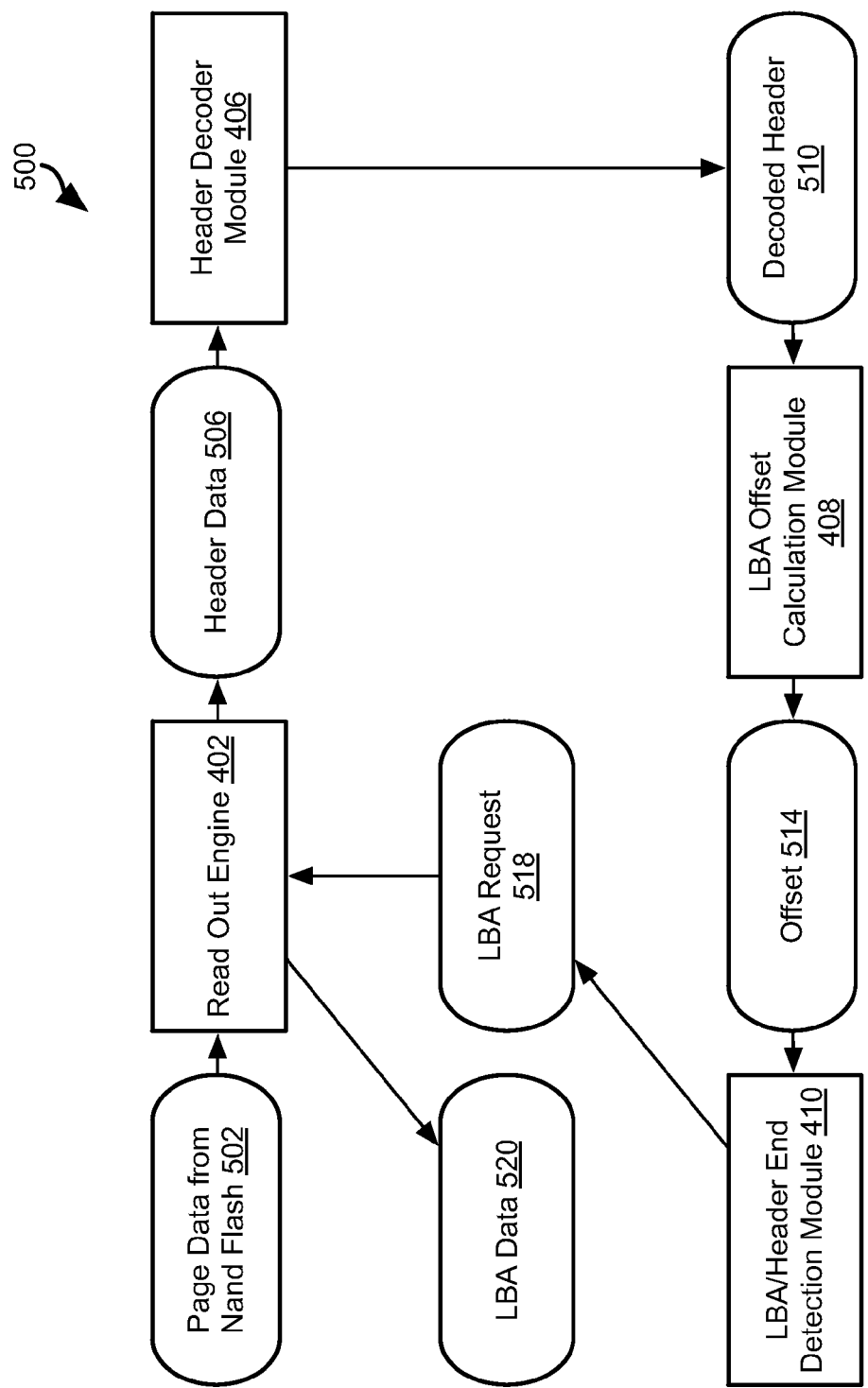
FIG. 5 is a process flow diagram of a method for reading compressed data in accordance with an embodiment of the present invention.

Referring to FIG. 5, the system 400 may be used to execute the illustrated method 500 with respect to a read instruction from a host device, the read instruction referencing an LBA of page within a nand flash storage device. The read out engine 402 receives transfer of header data in a request for an LBA and receives page data 502 from the nand flash in response. As noted above, the read out engine 402 may execute a page read request that requests the page data 502 from a nand flash device and stores it in an internal buffer. The read out engine 402 may provide header data 506 to a header decoder module 406. The header data 506 may be provided in response to a data transfer instruction from the hardware decoder 404. The header decoder module 406 decodes the header data to obtain the decoded headers 510. The decoded headers 510 are used by the LBA offset calculation module 408 to determine an offset 514 for a specific LBA that is referenced in the read instruction with respect to which the method 500 is executed. The offset 514 is used by the LBA/header end detection module 410 to determine an offset within the page at which the requested LBA begins. For example, the offset 514 may be added to a base address found to be the end of the header section of data stored in the page. The offset 514 may be used by the LBA/header end detection module 410 to determine an offset within the page for the requested LBA. A request 518 referencing this offset may be submitted to the read out engine 402 that then outputs the LBA data 520, i.e. the LBA codeword for the requested LBA.

The system of FIG. 4 and the method of FIG. 5 may be used to read data that encodes each LBA as independent codeword as shown in FIG. 3D. This means each codeword size may be variable depending on the compressed data result. In one example, for 25% compression, each codeword having an uncompressed size of 4 KB can range from 1 KB (25% of the original data) to 4 KB(100% of the original data). Headers for all LBAs inside the physical page, such as a 32 KB page are grouped inside the physical page and encoded into the Header codewords as described above with respect to FIG. 3D. Each header corresponds to one of the LBAs stored in the page in which the header is stored. Each header may include an identifier of the LBA to which it refers, a length of the LBA to which it refers, and firmware data.

In response to a read request from the host interface and subsequent to instructing the read out engine to read a page into its internal buffer, the hardware engine may read out the header codewords first and decode these header codewords. The decoding can occur in parallel to the remaining data transfer out from the nand flash. After decoding these codewords and obtaining the headers, the offset module 408 accumulates the length within the headers to generate the offset value (i.e. pointer to the starting location) of the encoded LBA codeword. For example, a start address/offset for LBA N would be Header_codeword_size*Number_of_Header codewords+Length(LBA M)). The hardware decoder 404 may match the requested LBA from firmware (e.g. a host interface) to the decoded header content to pull out the LBA offset inasmuch as the header contains a length for each of the compressed LBA data stream.

Once the LBA offset is obtained, the hardware decoder 404 may issue a data transfer command to read out the LBA codeword, which is then sent to the decoder, such as a hardware decoder. As the hardware decoder performs identifying and reading out the LBA codeword in the physical page, it does not need to re-issue the page reads thus accomplishing reading of both the header and LBA from a single page read memory access (~55 us).

Figure 6:
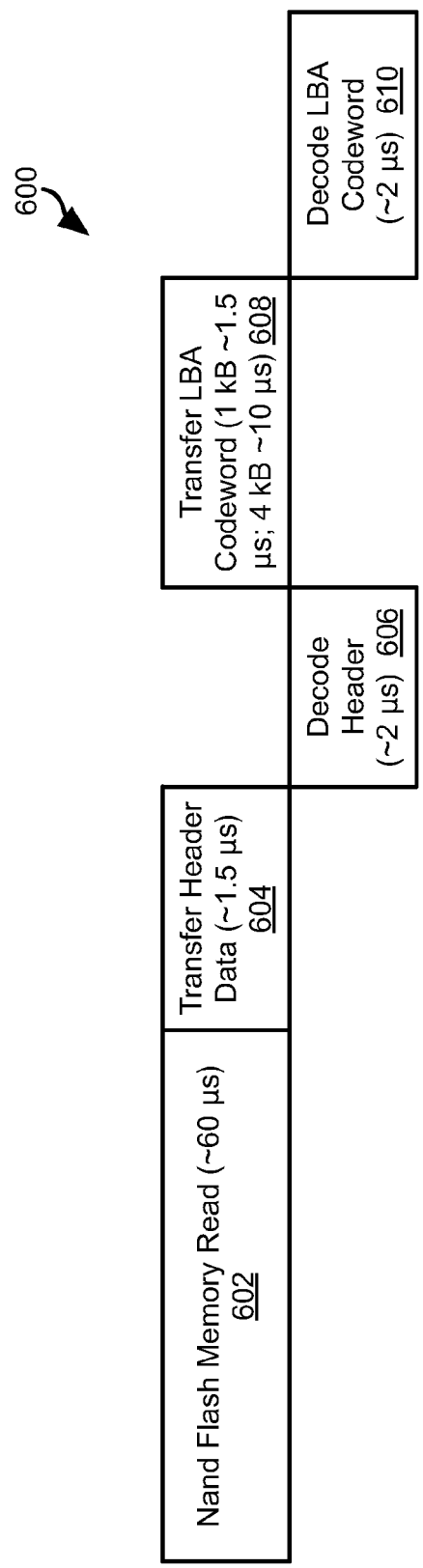
FIG. 6 is a timeline of a data read in accordance with an embodiment of the invention.

The header codeword may be small enough and take a short amount of time to be read out and decoded as compared to reading out and decoding the LBA codeword. As a result, the performance impact as compared to simply reading out the uncompressed LBA codeword based on the offset in the LBA table is very small. In most cases, the performance is actually better as the amount of data to be processed is reduced due to compression as compared to uncompressed data. For example, FIG. 6 illustrates a timeline of a read operation according to the methods of Case 5. As shown, a first delay 602 of about 60 µs for a page read is followed by a delay 604 of about 1.5 µs to transfer the header data to the hardware decoder 404. Decoding of the header may introduce a delay 606 of about 2 μs. During the delay 606, page reads to the die may be blocked by the hardware decoder 404 or read out engine 202. In particular, the delay 606 may be occupied with nand idle cycles. The requested LBA codeword may then be transferred, causing a delay 608 dependent on the length of the LBA codeword (~2.5 μs for 1 KB to ~10 μs for 4 KB). The LBA codeword may the be decoded causing a delay 610 of about 2 μs.

Figure 7:
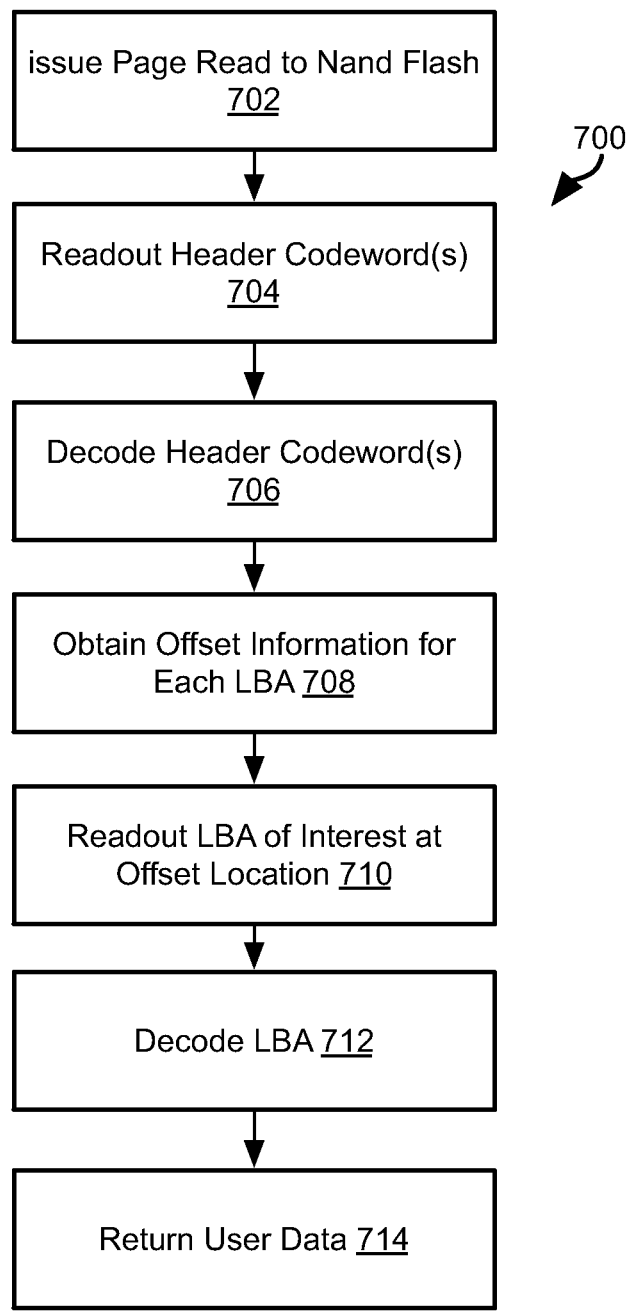
FIG. 7 is a process flow diagram of a method for reading compressed data in accordance with an embodiment of the present invention.

FIG. 7 illustrates a method 700 for processing read commands. The method 600 may be executed by a hardware decoder 404 in combination with the read out engine 402. The method 700 may be preceded by receipt of instruction from a host interface, or some other internal process such as garbage collection, to read a specific LBA from the nand flash device, the instruction referencing both the page in which the LBA is found an identifying which LBA of the page is to be read.

The method 700 may include issuing 702 a page read to the nand flash device for the page referenced in the read instruction from the host interface. In response, the read out engine 402 may read the page data for the page from the nand flash device in which it is stored (e.g. the appropriate nand die) and store the page data in a buffer.

The method 700 may include reading 704 one or more header codewords from the page data and decoding 706 the header codewords to obtain the headers. The headers may then be analyzed to obtain 708 offset information for some or all of the LBAs. For example, if LBA N is referenced in the read instruction, then the lengths of LBAs 0 through N−1 may be summed to obtain the offset for LBA N. Alternatively, a recursive method may be executed whereby the offset of LBA N−1 is calculated and then summed with the length of LBA N−1 to obtain the offset for LBA N. The offset for LBA N−1 may be obtained in the same manner based on the offset for LBA N−1 and the length thereof, and so on up to the offset of LBA 0 which is 0, or the last bit of the header section.

Once an offset is obtained, the method 700 may include reading 710 the LBA at that offset address. For example, where LBA N is requested, the corresponding header may be evaluated to determine the length L of the codeword for LBA N. L bits after the offset for LBA N as determined at step 708 may then be transferred.

The LBA codeword transferred at step 708 may then be decoded 712 and the user data of the LBA may be returned 714 to the host interface or other requesting component or process. Decoding 712 may include decompressing the LBA or the LBA may be decompressed after provision of the compressed LBA to the host interface or other requesting entity that issued the read instruction or by some other intervening entity or process.

The values characterizing the approach of Case 5 are as follows:

Logical Device Capacity: $128*4\text{ K}*256*16\text{ KB}=2^{41}=2$ TB

Number of LBAs locations in the device: 2 TB/4 KB=$2^{29}$ Entries

Total Bits in one Entry of the LBA table considering variable offset across 16 KB+page length=7 (For dies)+13 (For blocks)+8 (For pages)+0 (header contains the LBA codeword offset information)=28 Bits Per Entry Total LBA table size to store physical LBA location=28 Bits*$2^{29}$ Entries=1.75 GBytes Rounding each entry to byte, 4 Byte per Entry=4 Byte*$2^{29}$=2 GByte As is apparent in comparison with the other approaches (Cases 1-4), the approach of Case 5 has more free bits per entry as compared even to the uncompressed data. Table 1, below, shows the reduced bit requirement of Case 5 as compared to other three cases. This leads to direct savings in hardware memory resources and reduces complexity to manage LBA table entries. In particular, for each LBA written to a page, the corresponding entry in the LBA table may be created or maintained that does not store the length of the each LBA or an offset within a page to the each LBA.

TABLE 1

LBA Size and Table Entry Comparison

| Scheme | Total LBAs in 16 KB page | Number of codewords in the page | LBA Table Entries | LBA Entry size Needed | LBA Table size After Rounding per Byte |
|---|---|---|---|---|---|
| Uncompressed 4 KB User data | 4 | 4 | $2^{29}$ Entries | 30 Bits | 2 GByte |
| Compressed 4 KB User data (25% rate). Multiple LBAs per 4 KB codeword (Case 2) | Up to 16 | 4 | $2^{29}$ Entries | 33 Bits | 2.5 GByte |
| Compressed 4 KB User data (25% rate). (Variable codeword size per LBA) Pointer in LBA Table (Case 1) | Up to 16 | Up to 16 | $2^{29}$ Entries | 43 Bits | 3 GByte |
| Compressed 4 KB User data (25% rate). Single LBA codeword (Variable codeword size per LBA) Pointer in Header (Cases 3-5) | Up to 16 | Up to 16 | $2^{29}$ Entries | 28 Bits | 2 GByte |

Figure 8:
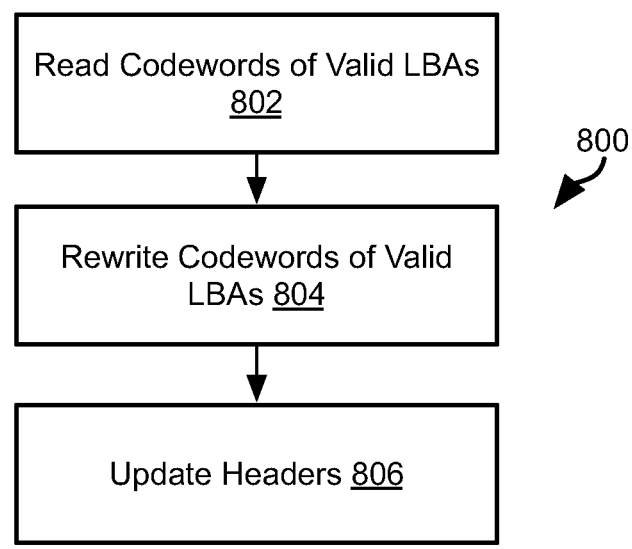
FIG. 8 is a process flow diagram of a method for garbage collection in accordance with an embodiment of the invention.

Referring to FIG. 8, the storage scheme for compressed LBA shown in FIG. 3D may enable simple and efficient garbage collection or defragmentation of an LBA. For example, the hardware decoder 404, readout engine 402, or other component may perform the illustrated method 800. For example, the method 800 may include reading 802 codewords of valid LBAs from a page and omitting reading invalid LBAs. Invalid LBAs may be LBAs that have been erased and no longer represent data to be stored. The method 800 may then include rewriting 804 the page including only the valid LBAs and omitting the invalid LBAs. An advantage of the storage schema of FIG. 3D is that the LBAs of valid codewords may be read and rewritten during the garbage collection process without decoding and recoding them or decompressing and compressing them during the garbage collection process.

The method 800 may further include updating 806 the header section for the page that is the subject of the method 800. In particular, headers corresponding to each of the valid LBAs may be encoded into one or more header codewords and written to the page as well. The headers may include the information noted in the methods above, including such information as a LBA identifier and length.

The systems and methods disclosed herein provide a hardware technique for smart header and retrieval to enable compressed data storage into a nand flash device. The hardware automation technique to decode the headers, obtain the LBA location in the nand page, and perform automated readout the LBA codeword provides a unique advantage for realistic usage of compression in the system. The combination of these approaches lead to power savings and performance gains for the system as well as host operations.

The present invention may be embodied in other specific forms without departing from its spirit or essential characteristics. The described embodiments are to be considered in all respects only as illustrative, and not restrictive. In particular, although the methods are described with respect to a nand flash SSD, other SSD devices or non-volatile storage devices such as hard disk drives may also benefit from the methods disclosed herein. The scope of the invention is, therefore, indicated by the appended claims, rather than by the foregoing description. All changes which come within the meaning and range of equivalency of the claims are to be embraced within their scope.

The invention claimed is:

1. A method for compression, the method comprising:
compressing a plurality of blocks of data to generate a plurality of compressed blocks;
generating a plurality of headers, each header including a compressed length of each compressed block of the plurality of compressed blocks;
writing the plurality of headers to a logical section of a non-volatile memory device, wherein the plurality of headers are represented as a header codeword;
writing the plurality of compressed blocks to the logical section;
reading a header codeword and the plurality of compressed blocks into a read-out buffer;
subsequent to the reading of the header codeword and concurrent with reading the plurality of compressed blocks, transferring the header codeword from the read-out buffer to a decoder and decoding the header codeword by the decoder;
determining a particular offset associated with a particular compressed block of the plurality of compressed blocks by summing the lengths included in headers of the plurality of headers prior to the header corresponding to the particular compressed data block;
subsequent to the decoding of the header codeword and in response to determining the offset, transferring only the particular compressed data block from the read-out buffer to the decoder based on the determined offset; and
decoding the particular compressed data block without decoding additional blocks of the plurality of compressed blocks.

2. The method of claim 1, further comprising updating a table relating logical identifiers of the plurality of blocks of data to a physical location of the compressed blocks, the table referencing only a physical location of the logical section in the non-volatile memory device without storing a length of the compressed blocks or an offset from the physical location of the logical section.

3. The method of claim 1, wherein writing the plurality of headers to a logical section of the non-volatile memory device comprises:
generating the header codeword including one or more error correction bits.

4. The method of claim 1, wherein headers for all compressed blocks of the plurality of compressed blocks written to the logical section are in a single contiguous section of the logical section.

5. The method of claim 4, wherein the single contiguous section is located closer to a starting address of the logical section than the plurality of compressed blocks.

6. The method of claim 1, wherein writing the plurality of compressed blocks to the non-volatile memory device comprises generating at least one codeword representing multiple compressed blocks of the plurality of compressed blocks, the at least one codeword including one or more error correction bits.

7. The method of claim 1, wherein the plurality of headers each include an identifier of one of the compressed blocks of the plurality of compressed blocks.

8. The method of claim 1, wherein writing the plurality of headers and plurality of compressed blocks to the logical section comprises performing a flash memory program operation with respect to the non-volatile memory device, the non-volatile memory being a flash memory device.

9. A method for reading compressed data, the method comprising:
receiving a read request from a host device by a memory controller device, the read request referencing a logical section of a storage device and a first block of data stored in the logical section;
reading a header codeword and a plurality of compressed blocks into a read-out buffer stored in the logical section, the header codeword including a plurality of headers each including an identifier and a length for the plurality of compressed data blocks stored in the logical section, the plurality of compressed data blocks including a first compressed data block representing the first block of data;
subsequent to reading the header codeword and concurrent with reading the plurality of compressed blocks, transferring the header codeword from the read-out buffer to a decoder to decode the header codeword;
decoding at least one of the plurality of headers corresponding to the first compressed data block without reading the plurality of compressed data blocks;
determining, by the memory controller device, an offset within the logical section for the first compressed data block from the decoded header using at least a length of the first compressed data block and a length of the decoded header;

subsequent to the decoding and in response to the offset determination, transferring only the first compressed data block from the read-out buffer to the decoder, based on the offset location within the storage device;

decoding the first compressed data block to obtain the first block of data based on the determined offset, wherein the decoding of the first compressed data block is performed without decoding the plurality of compressed data blocks; and returning the first block of data to the host device;

wherein determining the offset comprises summing lengths included in headers of the plurality of headers prior to the header corresponding to the first compressed data block.

10. The method of claim 9, wherein determining the offset further comprises determining an end location of the plurality of headers; and adding the summed lengths to the header corresponding to the first compressed data block.

11. The method of claim 9, wherein reading the header codeword comprises:

issuing, by the memory controller device, a page read to the storage device, the storage medium being a flash nand memory device;

reading, by the storage device, the logical section into a buffer;

issuing, by the memory controller device, a first transfer request for the header section to the storage device;

receiving, by the memory controller device, the header section.

12. The method of claim 11, wherein transferring the first compressed data block comprises:

issuing, by the memory controller, a second transfer request for the first compressed data block, the second transfer request being transmitted subsequent to issuing the page read to the storage device without execution of any intervening page read by the storage device.

13. An apparatus comprising:

a host computing device including one or more processors;

a storage device including a non-volatile storage medium; and a memory controller device operably coupled to the host computing device and the storage device, the memory controller device configured to, in response to receiving a single page read request associated with a first data block from the host computing device:

transfer a logical section of the storage medium into an internal buffer, wherein the logical section is associated with a header section and a plurality of data blocks;

subsequent to transferring the logical section associated with the header section and concurrent with transferring the logical section associated with the plurality of data blocks, transfer a header section of the logical section from the internal buffer to a decoder of the memory controller device and decode the header section, the header section including a plurality of headers each including an identifier and a length of a data block of the plurality of data blocks stored in the logical section;

evaluate the decoded header section to determine a sum of lengths of:

a length of a portion of the plurality of data blocks preceding the first data block; and a length of the header section;

in response to evaluating the decoded header, transfer only the first data block from the internal buffer to the decoder based on the evaluation;

decode the first data block based on the determined sum of lengths without reading and decoding all of the plurality of blocks; and transmit the first data block to the host computing device.

14. The apparatus of claim 13, wherein the memory controller device is configured to evaluate the header section by:

decoding the header section to extract the plurality of headers;

determining an end of the header section; and adding the portion of the sum of lengths corresponding to the portion of the plurality of data blocks to the end of the header section to determine an offset corresponding to the first data block.

15. The apparatus of claim 13, wherein the memory controller device is configured to prevent execution subsequent reading of the logical section into the internal buffer after instructing the storage device to read the logical section of the storage medium into the internal buffer and before transferring the first data block using the sum.

16. The apparatus of claim 13, wherein the memory controller is configured to decode the first data block prior to returning the first data block to the host computing device.

17. The apparatus of claim 16, wherein the memory controller device is configured to decompress the first data block prior to returning the first data block to the host computing device.

18. The apparatus of claim 16, wherein the memory controller is configured to:

read valid data blocks of the plurality of data blocks from the storage device without decoding or decompressing the valid data blocks and without reading invalid data blocks of the plurality of data blocks;

generating an updated header section for the valid data blocks; and write the header section and valid data blocks to the logical section.

19. The apparatus of claim 13, wherein the storage device is a nand flash device.

20. A method for reading compressed data, the method comprising:

receiving a read request from a host device by a memory controller device, the read request referencing a logical section of a storage device and a first block of data stored in the logical section;

reading a header codeword and a plurality of compressed blocks into a read-out buffer stored in the logical section, the header codeword including a plurality of headers each including an identifier and a length for the plurality of compressed data blocks stored in the logical section, the plurality of compressed data blocks including a first compressed data block representing the first block of data;

subsequent to reading the header codeword and concurrent with reading the plurality of compressed blocks, transferring the header codeword from the read-out buffer to a decoder to decode the header codeword;

decoding at least one of the plurality of headers corresponding to the first compressed data block without reading the plurality of compressed data blocks;

determining, by the memory controller device, an offset within the logical section for the first compressed data block from the decoded header using at least a length of the first compressed data block and a length of the decoded header;

subsequent to the decoding and in response to the offset determination, transferring only the first compressed data block from the read-out buffer to the decoder, based on the offset location within the storage device;

decoding the first compressed data block to obtain the first block of data based on the determined offset, wherein the decoding of the first compressed data block is performed without decoding the plurality of compressed data blocks; and returning the first block of data to the host device;

wherein determining the offset further comprises determining an end location of the plurality of headers and adding a sum of the lengths included in the headers of the plurality of headers prior to the header corresponding to the first compressed data block.

* * * * *